United States Patent [19]

Gerdt et al.

[11] Patent Number: 4,920,412
[45] Date of Patent: Apr. 24, 1990

[54] ATMOSPHERIC OBSCURANT PENETRATING TARGET OBSERVATION SYSTEM WITH RANGE GATING

[75] Inventors: David W. Gerdt; Lawrence H. Gilligan, both of Charlottesville, Va.

[73] Assignee: Sperry Marine Inc., Charlottesville, Va.

[21] Appl. No.: 288,549

[22] Filed: Dec. 22, 1988

[51] Int. Cl.[5] .......................... H04N 7/18; H04N 7/00
[52] U.S. Cl. ........................................ 358/95; 358/93; 356/5
[58] Field of Search ................. 358/95, 93, 107; 356/5

[56] References Cited

U.S. PATENT DOCUMENTS

| | | | |
|---|---|---|---|
| 3,467,773 | 9/1969 | Heckman, Jr. | 358/95 |
| 3,649,124 | 3/1972 | Takaoka et al. | 358/95 |
| 3,899,250 | 8/1975 | Bamberg et al. | 358/95 |
| 3,902,803 | 9/1975 | Lego | 358/95 |
| 4,202,014 | 5/1980 | Gilligan et al. | 358/228 |
| 4,226,529 | 10/1980 | French | 358/95 |

*Primary Examiner*—John K. Peng
*Attorney, Agent, or Firm*—Seymour Levine

[57] ABSTRACT

The system includes a television camera or an optical viewer device with a gated image intensifier input. A short intense laser pulse is transmitted to illuminate the scene. The image intensifier is gated on after a time delay equal to the round trip transit time of the pulse from a range slice of interest. The image intensifier is gated on for a time interval equal to the width of the laser pulse. In the television camera embodiment, one laser pulse per frame is transmitted and successive range slices are observed during successive frames by successively increasing the time delay. The range slice images are stored in a buffer and read out to a television display. In the optical viewer device embodiment, a segmented horizontally sliced electro-optical shutter is disposed adjacent the phosphor output of the image intensifier to transmit successive range slice information to an eyepiece of the device for viewing by an observer. The optical viewer device may be mounted on a helmet with an inclinometer on the helmet providing signals to program the segmented shutter.

13 Claims, 3 Drawing Sheets

ATMOSPHERIC OBSCURANT PENETRATING TARGET OBSERVATION SYSTEM WITH RANGE GATING

BACKGROUND OF THE INVENTION

1. Field of the Invention

The invention relates to systems for imaging a fog obscured scene such as a body of water (e.g., a harbor) or a runway from a landing aircraft, particularly with respect to optical image processing radar systems. The invention is useful not only in fog obscured environments but also with respect to other atmospheric obscurants such as haze, smoke, rain, snow, dust, and the like. The invention also relates to determining the range to illuminated targets in the scene.

2. Description of the Prior Art

A present day need exists for an inexpensive, reliable, compact and lightweight system for visually observing a scene in an optically obscured or attenuating environment. Atmospheric obscurants such as fog, rain, snow, smoke, dust and haze may render targets within the range of the system unobservable. Visual underwater observation systems also suffer from operating in a highly attenuating and obscuring optical environment. In, for example, laser illuminated television viewing systems, light backscattered from the interfering atmospheric entities obscures the viewing of forward illuminated targets. The backscattered light results from reflections off the atmospheric obscurants between the observer and a target of interest and from the target to the further distances. This non-imaging light, which is familiar to one who has driven in fog, obscures the desired imaging light in a background of optical noise.

Thus, it is appreciated that light directed from the observer to a target is scattered. Scattering changes the direction of a portion of the light beam and the thicker the atmosphere the more scattering that occurs. The backscattered light is reflected directly back at the observer, e.g., headlights in fog, obscuring the desired optical signal in a sea of optical noise.

Imaging systems for seeing through fog have been attempted utilizing blackbody radiation in the far infrared region of the electromagnetic spectrum. Although such systems have been utilized in aircraft, they require cryogenic cooling and very large lenses due to the long wavelengths of the thermal radiation. Hence, such systems tend to be very expensive, heavy and bulky and require excessive maintenance.

Additionally, the infrared camera is generally fixed relative to the aircraft and viewing is accomplished by observing a cathode ray tube display. Thus, the pilot, when using such a system, is not looking in the direction of interest such as out of the windshield and to the left. A helmet mounted display could, however, be utilized which servoes the camera to follow the head movement of the pilot. Such arrangements are complicated, expensive, heavy and bulky and require moving parts which tend to be unreliable.

Presently, the only other landing aids available are radar beacons and voice contact with air traffic controllers who are observing the position of the aircraft via ground based radar. In present day aircraft pilotage, it is essential that at some point of the approach, the pilot must either establish visual contact with the runway or abort the landing. Thus, landing an aircraft in very poor visibility can be extremely dangerous. Abortion of a landing may not be feasible because of such factors as low fuel, fog obscured nearly airports, and mechanical or medical emergencies. In a military environment, the aircraft may be damaged rendering landing abortion impossible. Thus, a desideratum of present day aircraft pilotage would be to render a runway visible to a pilot, which runway would otherwise be blind. Any improvement over the poor visibility situation could make the difference between a successful landing and a crash.

The problems discussed above are also prevalent in closed circuit television systems for observing a body of water such as a harbor or an estuary. Surveillance may be desirable both above and under the surface. Presently, there is no known apparatus for clearing atmospheric obscurants such as fog, haze, smoke and the like from a closed circuit television or other optical system field to view. Such apparatus would be highly desirable to the pilot of an aircraft, driver of a car or captain of a ship to see through a low visibility atmospheres such a described above in a fast, real time manner.

SUMMARY OF THE INVENTION

The above disadvantages of the prior art are overcome by a system that transmits an illuminating pulse and enables the receiver at the time the leading edge of the pulse reflected from a range slice of interest would impinge upon the receiver and disables slices corresponding to successive illuminating pulse transmissions are observed by successively delaying the time interval over which the receiver is enabled. The range slices are asembled to provide a view of the scene cleared of atmospheric obscurants. In a preferred embodiment, data received from a plurality of such range slices are stored and displayed to provide an image of the scene with optical obscurants such as fog removed. Preferably, the system utilizes intense illuminating laser pulses and a light intensifier receiver where the light intensifier is gated on and off to generate the range slice data. The invention also contemplates a segmented shutter for selectively transmitting slices of the intensifier image corresponding to the range slices.

One embodiment of the invention contemplates a television camera with the gated image intensifier providing the optical input thereto, means for storing and assembling the range slice data and a television monitor for displaying the assembled range slices.

Another embodiment contemplates a helmet mounted optical viewer with the gated image intensifier providing the input thereto and the segmented shutter utilized therewith. An inclinometer mounted on the helmet controls the segmented shutter in accordance with the viewing angle measured thereby.

DESCRIPTION OF THE PREFERRED EMBODIMENTS

Figure 1A:
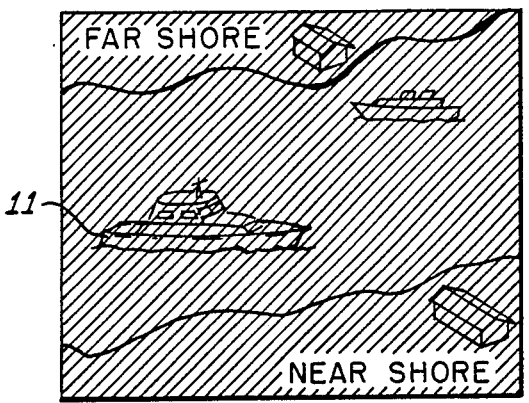
FIG. 1A is an illustration of a television picture obscured by fog in an optical radar system.
Figure 1B:
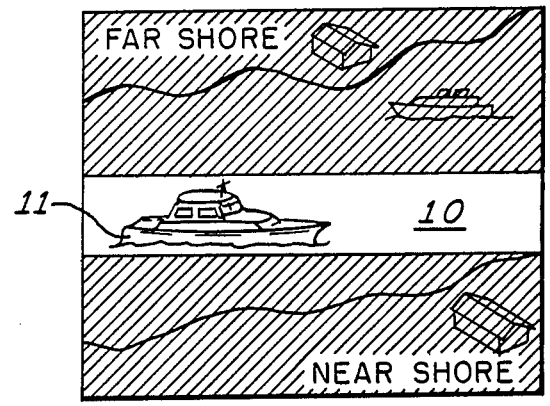
FIG. 1B is an illustration of the television picture of FIG. 1A showing a range slice with the fog removed.

Referring to FIGS. 1A and 1B, television pictures useful in explaining the present invention are illustrated. FIG. 1A shows a TV picture of a harbor obscured by an atmospheric obscurant such as fog. FIG. 1B shows the same television picture as FIG. 1A except with a range slice 10 cleared of the obscurant. Generally, the range-gated optical observation system of the present invention launches a short intense pulse of light to illuminate the scene of interest and an optical receiver such as a television camera views the scene through a gated image intensifier. In the example of FIGS. 1A and 1B, the television camera is viewing a harbor with the near shore on the lower portion of the television screen and the far shore at the top thereof. In between the near shore and the far shore are ship, boats, etc., such as a ship 11. When a predetermined interval of time has elapsed from the launching of the laser pulse for the leading edge of the pulse to reach the beginning of the range slice 10 and to be reflected from a target thereat back to the camera, the image intensifier is gated on. The intensifer is gated off after a time interval equal to the width of the pulse. At all other times with respect to the current laser pulse, the image intensifier is gated off. Therefore, only light reflected from the target 11 in the range slice 10 and any other object (including obscurants) in the range slice 10 is intensified and gated into the camera. All other nonimaging light which is backscattered from distances before and beyond the range slice 10 are rejected. The video signals received while the image intensifier is gated on pursuant to the range slice 10 are stored in a buffer and written to the appropriate area of a television screen.

The entire range of the television picture is divided into horizontal range slices such as the range slice 10 with the video signals being stored to the buffer. The range slices are sequenced from the bottom to the top of the television picture. Writing the television display from the buffer provides a cleaned up view of the scene. The intensity of the illuminating pulse must be of sufficient magnitude to penetrate the obscured scene and return from a target at the farthest range of interest with sufficient signal strength to be detected.

Thus, a short intense laser pulse or timed array of pulses is transmitted to intensely illuminate a target and thereby overcome the severe atmospheric attenuation associated with optically thick atmospheres. An underwater system would operate in short path visibility water such as might be found in harbors or estuaries. The color of the laser light is chosen for optimum transmission through water. The image intensifier at the source is gated on at the time the image of the target is received and off in accordance with the optical pulse width. The gating of the intensifier is successively delayed so that the range slices are obtained from the near shore to the far shore. Thus, only light reflected from objects in the range slice being examined is displayed on the TV screen and not backscattered non-imaging light while is shuttered out by the intensifier gating.

Figure 2:
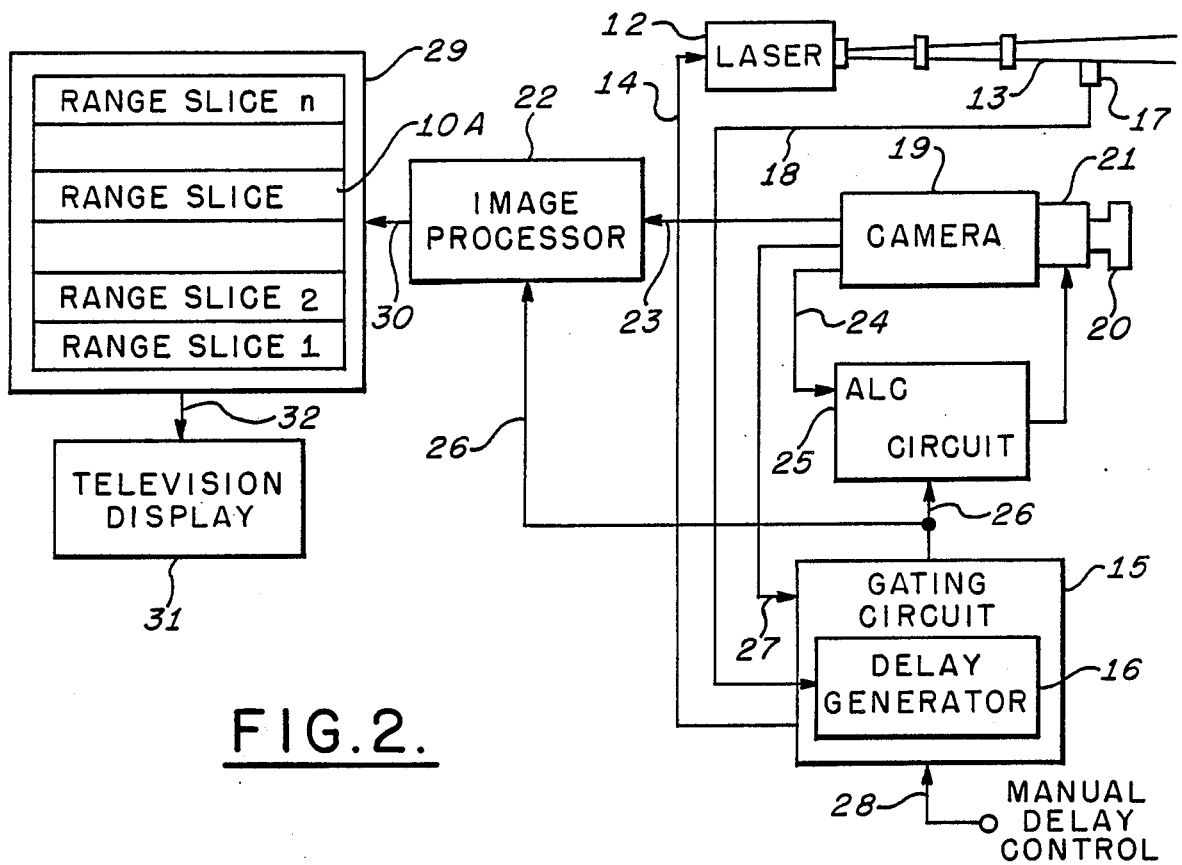
FIG. 2 is a schematic block diagram of a range-gated, optical image processed radar system configured in accordance with the present invention.

Referring to FIG. 2, a schematic block diagram of a range-gated, optical image processed radar system configured in accordance with the present invention is illustrated. The system of FIG. 2 utilizes an intensified television camera system with automatic light control (ALC) similar to that disclosed in the following patent and copending patent applications assigned to the assignee of the present invention: U.S. Pat. No. 4,202,014, issued May 6, 1980, "Pulse Modulated Automatic Light Control" by Gilligan et al; U.S. Pat. No. 4,872,057 issued Oct. 3, 1989, "Pulse Modulated Automatic Light Control Utilizing Gated Image Intensifier" by Woolfolk; and U.S. Pat. No. 4,882,481 issued Nov. 21, 1987, "Automatic Brightness Control for Image Intensifiers" by Gilligan et al. Said U.S. Pat. Nos. 4,202,014 4,872,057 and 4,882,481 are incorporated herein in their entirety.

The system includes a high intensity gateable laser 12 providing a high intensity illuminating laser beam 13. The laser 12 may for example be an Nd:YAG laser or a laser diode array. The laser 12 provides short pulses of very intense light. A doubled Nd:YAG laser is useful in an underwater system to provide an intense green light pulse. Laser wavelengths outside of the green "water window" would suffer severe attenuation and thus be unuseable in an underwater system.

The laser 12 is triggered via a line 14 from a gating circuit 15 which includes a delay generator 16. System timing may be provided by a fiber optic sampler 17 that samples the laser beam 13 to provide a timing signal to the gating circuit 15 via a line 18. Alternatively, system timing within the gating circuit 15 may be provided by the laser trigger pulse 14. Flash lamp illuminated lasers such as the Nd:YAG type suffer from excessive jitter between the trigger pulse and the emergence of the light pulse at the laser exit. With such lasers, sampling the output beam 13 by the fiber optic sampler 17 provides stable system timing. Laser diodes, on the other hand, do not suffer from this phenomenon and systems utilizing such diodes can derive system timing from the laser trigger pulse on the line 14.

The scene illuminated by the laser 12 is viewed by a television camera 19 through a lens 20 and a gated image intensifier 21. The image intensifier 21 is of the type described in said U.S. Pat. No. 4,882,481. The lens 20 images the scene on the intensifier input. The intensifier 21 amplifies the return optical signals and functions as a precision switch to extract range slices, in a manner to be further described. The camera 19 records the image provided by the intensifier 21 on a focal plane array.

The camera 19 provides conventional video signals representative of the image viewed to an image processor 22 via a line 23. In the manner described in said U.S. Pat. No. 4,882,481, the camera 19 provides an integrated light level signal on a line 24 to an automatic light control (ALC) circuit 25. In the manner described in said U.S. Pat. No. 4,882,481, the ALC circuit 25 rapidly gates the image intensifier 21 on and off controlled by the integrated light level signal on the line 24 so as to maintain an image of controlled light level. The gating circuit 15 enables the ALC circuit 25 via a line 26 so that the image intensifier 21 is enabled during predetermined time intervals to generate the range slices. The gating circuit 15 functions as a timer switch to gate the image intensifier 21 on and off and provides a clock, via the line 26, for the image processor 22 so that a particular range slice can be processed. The gating circuit 15 is synchronized to the frame time of the camera 19 by a signal on a line 27. The gating circuit 15 triggers the laser 12 via the line 14 to send out the intense illuminating pulse 13. The timing pulse on the line 18 is delayed by the delay generator 16 by an amount appropriate to the range slice to be observed. The gating circuit 15 enables the ALC circuit 25 to turn on the intensifier 21 when light from the range slice of interets is about to impinge on the lens 20. The gating circuit 15 turns off the intensifier 21 when a time interval has elapsed equal to the width of the transmitted laser pulse. The gating circuit 15 provides an automatic sequencing of the delay generator 16 so as to illuminate and observe successive range slices of the scene. A manual delay control 28 is also provided to manually set the delay generator 16 in accordance with a preselected range slice.

The image processor 22, via the signal on the line 26, determines the range slice currently being observed and digitally stores the image information on the line 23 for this range slice and continually rewrites this information for the same range slice. During a particular frame, the image processor 22 only stores the information for the current range slice blocking information from all other range slices until the other range slices are processed in their turn in the sequence. A digital frame buffer 29 digitally stores a frame of the scene and is continuously updated a slice at a time from the image processor 22 via a line 30. The frame buffer 29 transmits cleaned up images of the scene to a conventional television display 31 via a line 32. The television display 31 displays the cleaned up images of the scene without the atmospheric obscurant.

Figure 3:
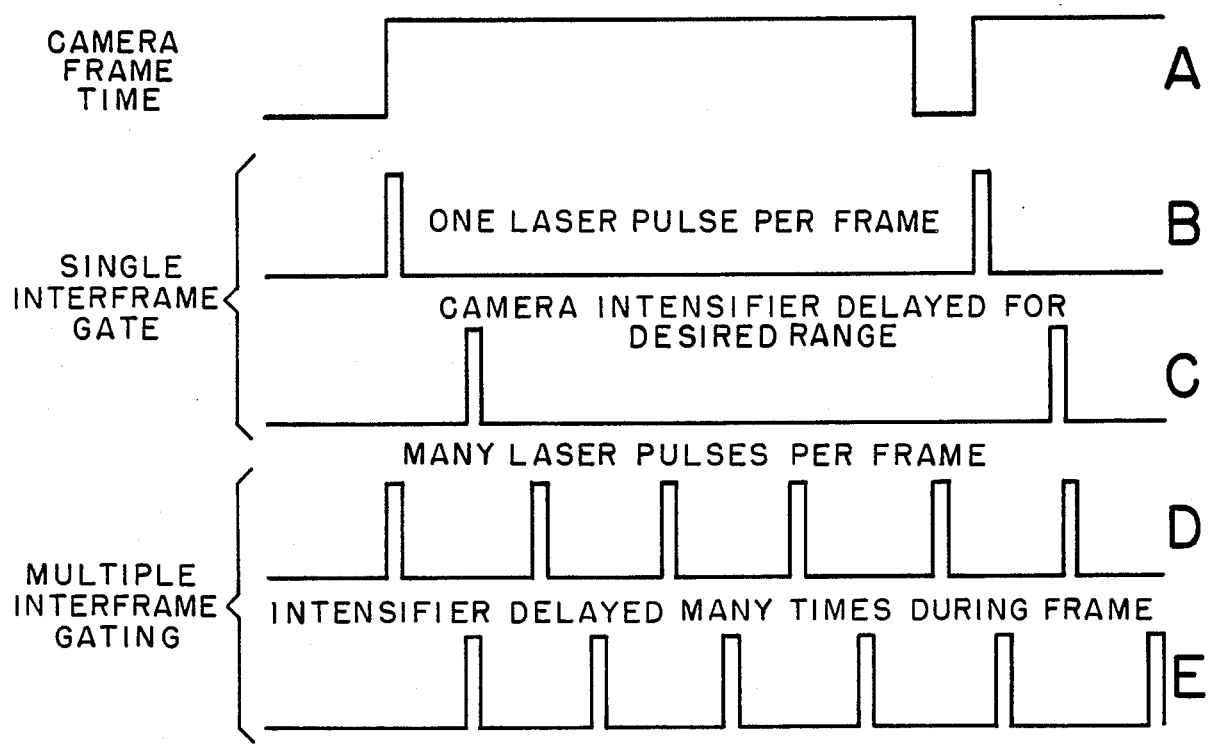
FIG. 3 is a diagram illustrating waveforms useful in explaining the operation of the system of FIG. 2.

Referring to FIG. 3, pulse waveforms useful in understanding the operation of the system of FIG. 2 are illustrated. Waveform A represents the camera frame rate, for example 30 Hz, and is the television frame synchronizing signal on the line 27. Waveform B represents the laser trigger on the line 14 which launches the laser pulse 13 at the start of the frame time. The laser trigger pulse of waveform B may, for example, provide a laser light pulse of 20-50 nanosecond width. Waveform C, which appears on line 26, represents the gating of the camera 19 by the intensifier 21 delayed for the desired range slice relative to the laser trigger pulse of waveform B. The camera gating pulse is approximately the same width as the laser trigger pulse of waveform B and is delayed for the time interval required for the laser pulse to reach the desired range slice and be reflected back to the television camera 19. Waveform D represents multiple firing of the laser 12 within the frame time. The duration between these pulses represents a time for the light to attain a distance where it becomes sufficiently attenuated so as not to interfere with the image from the following pulse. Waveform E represents the gating of the camera 19 by the intensifier 21 within the camera frame period relative to the multiple laser pulses of waveform D.

The image intensifier 21 of the range gated camera system of FIG. 2 functions as an electrically actuated light valve or shutter. The image intensifier 21 also amplifies incoming light by a gain of approximately 10,000, thus partially compensating for attenuation losses caused by the thick and lossy atmosphere. The present invention, therefore, utilizes both the amplification and gating properties of the image intensifier 21. The image intensifier is of the type described in said U.S. Pat. No. 4,882,481 comprising a photocathode input, a multi-channel plate photomultiplier and a phosphor output.

As the intense laser pulse travels to a target in the range slice of interest and back to the camera 19, the significant amount of backscattered light that impinges upon the lens 20 in this time interval is excluded from the camera 19 by turning the photocathode of the image intensifier 21 off during this time interval. The target in the range slice of interest is illuminated for a time duration equal to the time duration of the optical pulse. When the pulse reflected from the target impinges upon the lens 20, the photocathode of the intensifier 21 is gated on for the duration of the pulse and thereafter gated off. Thus, backscattering as well as target images beyond the range slice of interest is shuttered out from the camera 19. Only the image of the target in the range slice of interest is amplified and not the optical noise caused by backscattering.

With continued reference to FIGS. 1A, 1B and 2, the gating circuit 15 controls the delay generator 16 to step the rnge slice 10 from the bottom to the top of the picture thus stepping the range gated system from the near shore to the far shore. Succesive range slices may be taken during successive frames of the camera 19. Thus, a subsequent frame sees the next progressive range slice. Several television frames may be utilized for each range slice. The range slice information is stored as a digital image in the frame buffer 29, in the appropriate range slice thereof. Only the slice to which the range gated laser illuminated television system has been applied is stored. Range slices of the image which are obscured during a particular frame are not stored. Only the range slice which is being ranged gated as the slices are horizontally stepped from the near shore to the far shore is rewritten to the frame buffer 29. Horizontal range slices are not rewritten to the buffer 29 if they are not from a range gated slice.

The frame buffer memory 29 is scanned at the frame rate of the camera 19 while the range stepping continues. The frame buffer 29 is comprised of storage locations for the range slices comprising the scenes. For example, range slice 1 corresponds to the near shore and range slice n corresponds to the far shore (FIGS. 1A and 1B). A range slice 10A in the buffer 29 represents storage for the range slice 10 of FIG. 1B. Each range slice storage location corresonds to a predetermined delay of the delay generator 16. When the image processor 22 transmits the data, via the line 30, for the current range slice being examined, the image processor 22 also transmits, via the line 30, the address of the corresponding range slice in the frame buffer 29. The scanned information provided to the television display 31 via the line 32 provides a clear image of the entire scene. The picture of the television display 31 is being constantly rewritten during observation. The image appears similar to slow scan television and may be slightly erratic for fast moving ships.

It is therefore appreciated that the range gating technique of the present invention removes the backscattering of illuminant light which normally obscures visual observation of targets. As an example of the use of the system exemplified by FIGS. 1A, 1B and 2, consider the gateable camera 19 surveying the scene of FIG. 1A with the far shore one mile away. In air, light travels about one foot per nanosecond. If the gating circuit 15 gate the camera 19 on, 5280 nanoseconds after the pulse leaves the system and gates the camera 19 off 50 nanoseconds thereafter, a narrow 50 foot band of image 10 in the middle of the screen is generated. The ship 11 within this 50 foot range is observed, but any ships beyond this range are not observed during this scan. Targets in front of this range, that obstruct the path of the light, appear on the television display 31 as back lighted silhouettes with the light appearing to come from one-half mile out. This mode of operation will be hereinafter described.

The gating circuit 15 automatically controls the delay generator 16 such that one or several television frames observe the near shore plus 50 feet, then one or several frames observe the region from 50 to 100 feet, then 100 to 150 feet, and so on until the shore is reached. The process then begins again at the near shore. The frame buffer 29 stores each 50 foot slice as it is received and rewrites only this slice on the appropriate area of the television screen 31 for every frame, until this slice itself is actively re-written by the scanning process. The television screen 31 is then a cleaned-up picture of 50 foot range gated intervals. The gating circuit 15 provides continuous repeating series of laser pulses each followed by an appropriately delayed camera gating pulse resulting in real time observation of a target otherwise obscured by fog or other atmospheric obscurants.

The gating circuit 15 may also be configured so that each television raster line corresponds to a range slice. With a 525 line raster, laser pulses are transmitted from the laser 12 at a rate of 525 per second. The gating circuit 15 successively increases the delay generator 16 so that slices are taken from the near shore to the far shore. The frame buffer 29 only stores the television line which corresponds to the range slice which the camera 19 is observing. The next raster line is the next range, etc. This selective line per frame storage is read out onto the television display 31 every second. The nonimaging fog has, however, been removed.

Control over the range slice distance by adjusting the delay 16 permits a manual search of an obscured field of view via the manual delay controls 28. The manual delay control may be utilized to set the delay to corresponds to a desired distance of viewing. Radar or sonar systems may provide inputs to the manual delay control 28 to observe range commanded by the external systems. For use in aircraft, signals from the ground could set the delay 16 via the manual delay control 28 to establish the best viewing conditions.

The system of the present invention may be set to a maximum range viewing mode via the manual delay control 28 to detect targets in the field up to the maximum range. The targets appear on the television display 31 as silhouettes. In a surveillance system it is not always practical to search the field of view step-wise in time. The maximum range viewing mode can then be utilized by setting the time delay 16 at a maximum distance, for example, two miles. Targets at the maximum distance are illuminated for viewing. Targets closer than the maximum distance appear as silhouettes or shadowed areas on a bright field of light which appears to originate at the maximum distance. Targets beyond the maximum distance would not be detected.

By backlighting and obtaining silhouettes of targets, the target locations are readily discerned on the TV display 31. As the pulse delays are shortened via the manual delay control 28, the target of interest will come into clear view. The distance to the target is now known because of the delay required to observe it. Further decrease in the pulse delay of the delay generator 16 results in the target disappearing. Successive targets detected buy the silhouetting method may then be ranged by manually adjusting the delay via the control 28.

In the embodiment of the invention described above with respect to FIGS. 1A, 1B and 2, the laser 12 transmits a narrow time width, intense pulse to illuminate the scene and the delay generator 16 is adjusted to turn on the image intensifier 21 so as to acquire data for a range slice corresponding to the delay. The range slice data is stored in the appropriate range slice location of the frame buffer 29. Successive range slices are similarly acquired and stored corresponding to successively transmitted laser pulses by successively increasing the delay time of the delay generator 16. The cleaned-up range slices are read from the frame buffer 29 into the television display 31 at the TV frame rate to provide an atmospheric obscurant free picture of the scene.

Another embodiment of the invention designed for direct viewing of a scene utilizes an image intensified direct viewing optical device, such as monocular, where an intense laser pulse illuminates the scene and the image intensifier is range gated as described above. A segmented electro-optical shutter disposed between the viewing eyepiece and the intensifier output image replaces the frame buffer 29 and television display 31 of the above-described embodiment. The shutter is divided into range slice segments and the eye of the viewer integrates successively transmitted range slices into an image of the scene being viewed free of atmospheric obscurants. Although not limited thereto, this embodiment of the invention is contemplated for use in aircraft mounted on a helmet worn by the pilot. As a further feature, an inclinometer on the helmet is utilized to adjust the range gate delay as well as the operation of the segments of the shutter.

Figure 4:
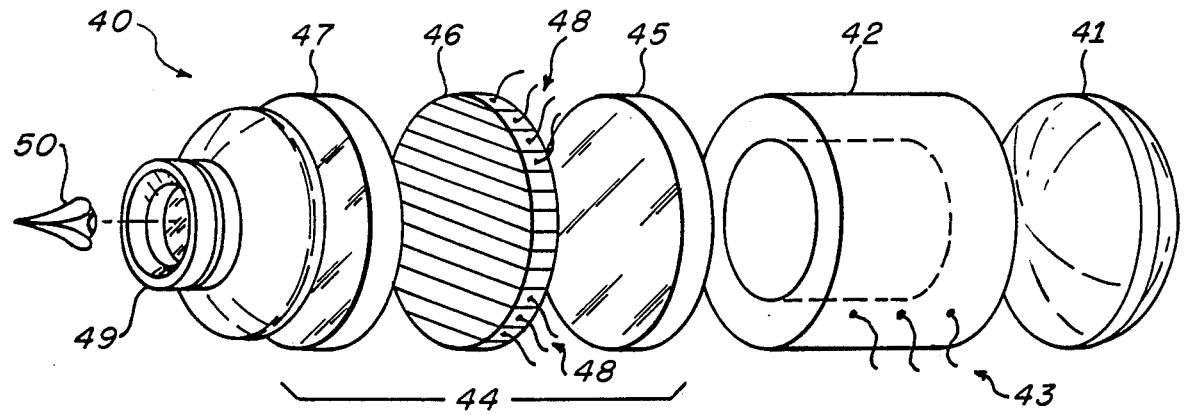
FIG. 4 is a schematic elevation view of a range-gated viewing device for a helmet mounted system.

Referring to FIG. 4, a range gated viewing device 40 for the helmet mounted embodiment of the invention is illustrated. The device 40 includes an objective lens 41 which determines the field of view of the device. The objective lens 41 images the field of view onto the photocathode of a gated image intensifier 42. The image intensifier 42 is gated and powered by inputs 43 thereto. Disposed adjacent the output phosphor of the image intensifier 42 is a segmented horizontally sliced electro-optical shutter 44. The shutter 44 is comprised of a polarizer 45, a segmented electro-optically actuated polarization rotator 46 and a second polarizer 47. Lines 48 connect to the individual horizontal shutter segments for controlling the operation of the shutter 44, in a manner described. An eyepiece or ocular 49 views the image transmitted through the shutter 44. The observer's eye is denoted by reference numeral 50. The polarization axes of the polarizers 45 and 47 are orthogonal with respect to each other and the segments of the rotator 46 do not affect the polarization axis when power is not applied to the lines 48. When a segment is energized via the appropriate one of the lines 48, the energized segment rotates the polarization axis by 90°. Thus, without energization, light is blocked by the shutter 44 but is transmitted through a segment when energized to the eyepiece 49. The polarizer 47, therefore, functions as an analyzer.

Figure 5A:
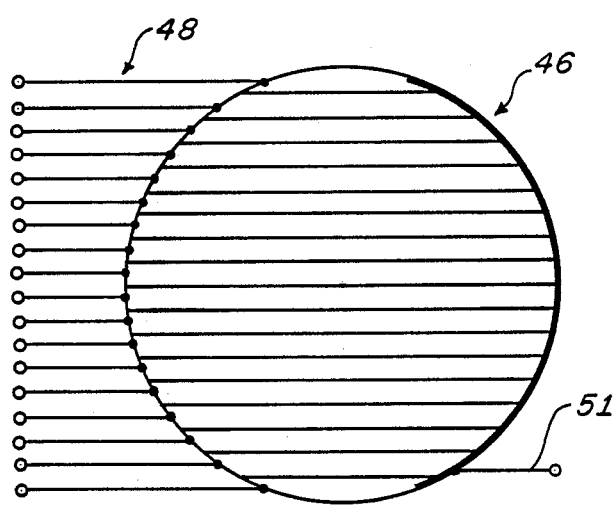
FIG. 5A is a schematic front elevation view of the segmented electro-optical shutter of FIG. 4.
Figure 5B:
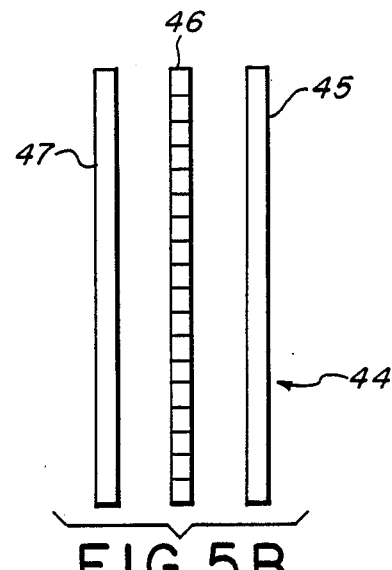
FIG. 5B is a schematic side elevation view of the segmented electro-optical shutter of FIG. 5A.

Referring to FIGS. 5A and 5B, in which like reference numerals indicate like components with respect to FIG. 4, details of the segmented horizontally sliced electro-optical shutter 44 are illustrated. FIG. 5B depicts a side elevation view of the shutter 44 comprising the polarizer 45, the horizontally segmented electrically adjustable polarization rotator 46, and the analyzer 47. The polarizer 45 an analyzer 47 may each comprise a Polaroid sheet or film or various types of calcite or quartz polarizing prisms. The rotator 46 comprises a material such as lanthanum doped lead zirconium titanate (PLZT) or an electrically berefringent liquid crystal.

FIG. 5A depicts a plan elevation view of the segmented horizontally sliced polarization rotator 46. The rotator 46 is segmented into horizontal strips or sections, each of which is independently controlled by a switch voltage bias applied to the appropriate selected lines 48. A common electrode 51 connected to all of the horizontal segments of the rotator 46 provides a ground or return path for the segments. By appropriate application of signals to the lines 48, the segments of the shutter 44 may be programmed. One segment may be on while the remaining segments are off or all may be on or any combination of on and off segments may be effected.

Figure 6A:
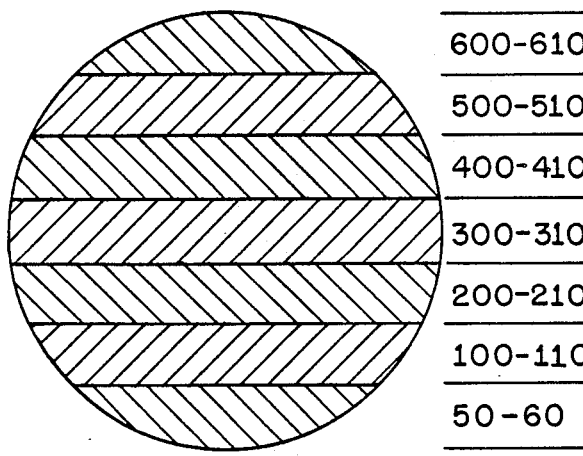
FIG. 6A is an example of the range slices effected by the segmented shutter of FIG. 5A.
Figure 6B:
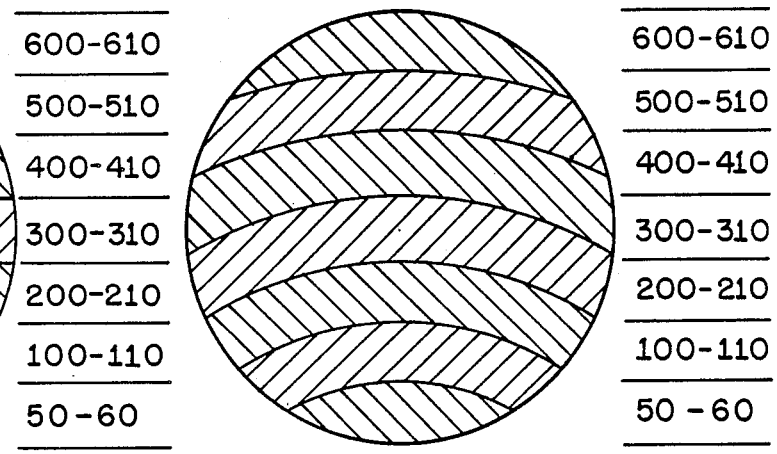
FIG. 6B is a further example of range slices obtained utilizing the segmented shutter of FIG. 5A.

Referring to FIGS. 6A and 6B, examples of the range slices into which the segmented shutter 44 may divide the field of view are illustrated. FIG. 6A depicts range slices in meters where each segment is on, for example, for 1/10 of a second and off for 9/10 of a second. The shutter segments are sequentially turned on with only one segment on at a time. The gating pulses to the image intensifier 42, in a manner similar to that described above, are successively delayed so that the field of view is divided into horizontal range slices. The segments of the shutter 44 correspond to these range slices. Since each segment of the shutter 44 is turned on in sequence, persistence of vision of the observer, e.g., 1/15th of a second, will create a mosaic of range slice images comprising the viewed scene with the atmospheric obscurants removed. Thus, a scene which is obscured in fog or the like can be cleared up a slice at a time. The nonactivated segments of the shutter 44 block non-imaging light from the segment associated with the range slice being observed. FIG. 6B illustrated curved range slice shutter segments so that the segments realistically represent bands of equal range with respect to an aircraft in which the device is utilized. Curved segments are used for wide field of view and parallel straight segments are used for narrow field.

Figure 7A:
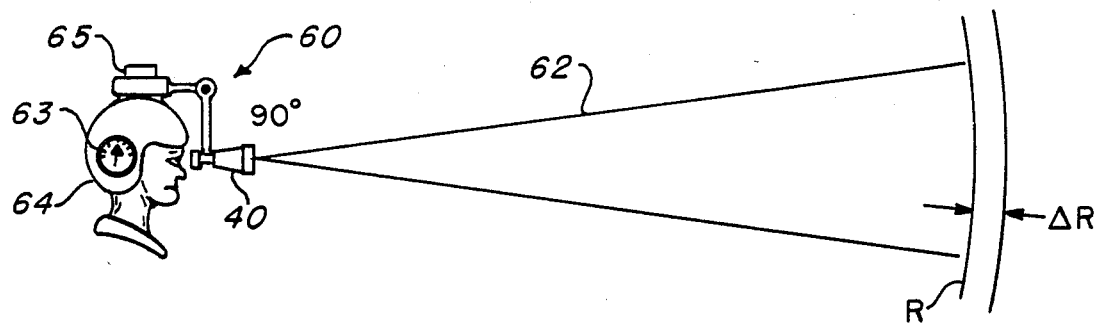
FIG. 7A is an illustration of the use of the device of FIG. 4 in a helmet mounted application.
Figure 7B:
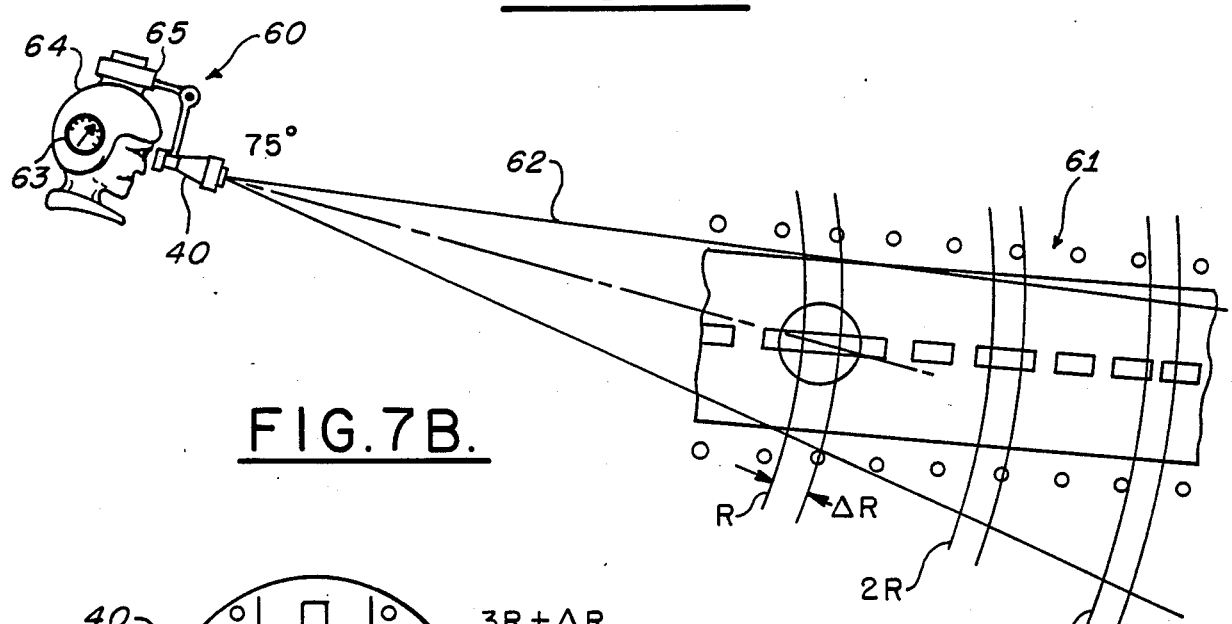
FIG. 7B is an illustration of the system of FIG. 7A with an oblique viewing angle.
Figure 7C:
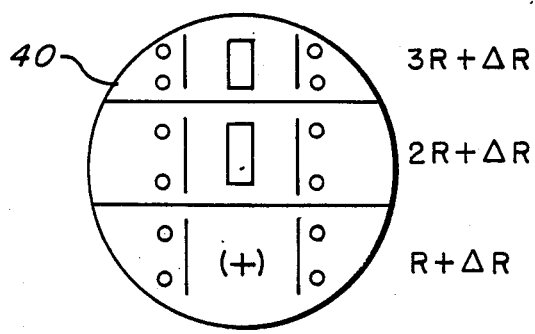
FIG. 7C is a schematic illustration of the image obtained by the device of the present invention when utilized in accordance with FIG. 7B.

Referring now to FIGS. 7A, 7B and 7C, the viewing device 40 in a helmet mounted embodiment is illustrated. In FIG. 7B, a pilot 60 is looking down at, for example, a runway 61. The pilot may be looking down at, for example, an angle of 75° from horizontal. The field of view 62 is determined by the objective lens 42 (FIG. 4). The start of the runway 61 is at the lower part of the field of view and the end of the runway is imaged onto the upper part of the display. A level indicator or inclinometer 63 mounted on a helmet 64 worn by the pilot measures the deviation from horizontal viewing. Circuitry 65 organizes the shutter 44 based on the angles measured by the inclinometer 63 and synchronizes the gating of the image intensifier 42 with the launching of the laser illuminating pulses as described above with respect to the embodiment illustrated in FIG. 2. FIG. 7C illustrates the pilot's view of the runway 61 cleared of atmospheric obscurants. In FIG. 7A, in which like reference numerals indicate like components with respect to FIG. 7B, the pilot 60 is illustrated looking straight ahead at an angle of 90°.

The circuitry 65 includes means for programming the width of the range slices in accordance with the signal from the inclinometer 63. In FIG. 7A, with the pilot looking straight ahead, the circuitry 65 sets all shutters to a maximum range providing one continuous slice. Targets between the pilot 60 and the maximum range are silhouetted as described above. The range gate delay could then be manually adjusted for viewing within specific desired ranges. FIG. 7B illustrates the pilot looking downward at an angle of 75° from horizontal and the circuitry 65 programs three segments corresponding to three sections of the cleaned-up image. If the pilot looks downward at an even steeper angle, additional segments are accessed. The circuitry 65 controls the segments of the shutter 44 to ranges appropriate for the viewing angle.

Thus, the segmented electro-optical shutter 44 provides for various viewing situations. Each, or several, or all of the segments can be associated with a particular distance to a target. The shutter segmentation may be programmed automatically by the input from the inclinometer 63 via the circuitry 65. The shutter segmentation may be manually controlled if it is desired to observe a particular target at a particular range. Alternatively, the segments may all be set at maximum range. Under this operating condition, all targets from the source to the maximum range appear as dark silhouettes against a bright background as previously described.

Thus, the embodiment of the invention described with respect to FIGS. 4-7, provide a helmet mounted imaging system which is electro-optically shuttered into a plurality of horizontal slices. The view to the observer is substantially the same as if no atmospheric obscurants were present. The view and shutter arrangements change depending on the angular inclination of the helmet 64 as detected by the inclinometer 63.

The system of the present invention exemplified by the embodiment of FIGS. 4-7 comprises an illmuinator, the viewing device of FIG. 4 and range control circuitry of the type described with respect to FIG. 2. Such a system is approximately 10-20% of the cost of the far infrared system described above with respect to the prior art. No moving parts are utilized as would be required in a prior art servoed or electro-mechanically scanned system. The intensified viewing device 40 is helmet mounted and the pilot looks in the desired direction. Maintenance problems are significantly reduced with the system of the present invention compared to prior art systems. There are no systems existing in the prior art that provide the solutions to the problems described herein that are as practical and inexpensive as the present invention.

In all of the above-described embodiments of the invention, range to an illuminated target is obtained via the delay value of the range gate. In the embodiments of the present invention, narrow intense laser pulses are transmitted from the observer to the fog obscured target. The gated intensifier and the electro-optical shutter remain off while the pulse travels through the fog to the target and is reflected back from the target. The intensifier and shutter gate is activated when the reflected pulse is received by the ovserver. Only forward scattering is received from the target which does not obscure the view. Image obscuring backscattering is shuttered out. The present invention temporally removes the backscattered light that tends to obscure visual observation of the target. The gated intensifier or shutter may be time sequenced at longer and longer intervals for target search and then locked to the target providing target range. The present invention permits observers such as pilot's to see through fog and measure range, via optical range finding up to approximately six times the meterological range determined by fog density.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Apparatus for use in a target observation system for clearing obscurants from a scene to be observed, said system including a source of pulses of illuminant energy for illuminating said scene, comprising
   gated receiver means for receiving illuminant energy from said pulses reflected back from said scene, and providing an image in accordance therewith,
   gating means for providing a gating pulse to said gated receiver means to receive said illuminant energy over the width of said gating pulse,
   delay means for delaying said gating pulse in accordance with the travel time required for a pulse of illuminant energy to travel from said source to a range slice of said scene and back to said gated receiver means so that said gated receiver means is disabled during said travel time from receiving said reflected illuminated energy,
   thereby providing an image of range slice cleared of said obscurants,
   adjustment means for adjusting said delay means in accordance with successive range slices of said scene, and
   isolating and assembling means cooperative with said adjustment means for isolating images of said successive range slices and assembling said images into an image of said scene cleared of said scene obscurants.

2. The apparatus of claim 1 further including means for selectively adjusting said delay means so as to obtain the range to a target in said range slice.

3. The apparatus of claim 1 wherein
   said source of pulses of illuminant energy comprises a pulsed laser, and
   said pulses of illuminant energy comprise laser pulses.

4. The apparatus of claim 3 wherein said gated receiver means comprises
   a television camera, and
   a gated image intensifier, at the optical input of said television camera, responsive to said gating pulses for enabling and disabling said television camera with respect to laser pulses reflected back from said range slices of said scene,
   said television camera providing video images of said range slices when said image intensifer is enabled.

5. The apparatus of claim 4 wherein said isolating and assembling measn comprises:
   frame buffer means for storing said video images of said range slices to form a frame of said scene.
   image processor means for isolating video images of said successive range slices by storing video images of one range slice at time and coupling video images of each one range slice to said frame buffer means at appropriate an location in said frame buffer means to provide contiguous range slices and establish a frame of said scene, and
   television display means responsive to said frame buffer means for displaying said contiguous range slices.

6. The apparatus of claim 3 further including fiber optic sampling means responsive to said laser pulses for providing timing signals to said delay means.

7. The apparatus of claim 3 wherein said gated receiver means comprises
   an optical viewer, and
   a gated image intensifier at the input of said optical viewer,
   said optical viewer providing optical images of said ranges slices.

8. The apparatus of claim 7 wherein said gated image intensifier has a phosphor output.

9. The apparatus of claim 8 further including a segmented shutter disposed adjacent said phosphor output, said shutter comprising segments corresponding to respective range slices.

10. The apparatus of claim 9 wherein said segmented shutter comprises
    first and second polarizers with optical axes orthogonally disposed with respect to each other, and
    a segmented polarization rotator with independently electrically actuated polarization rotation segments, each said segment rotating the axis of polarization by 90° in response to electrical energization applied thereto,
    said segments corresponding to said range slices, respectively.

11. The apparatus of claim 9 wherein said gated receiver means is mounted on a helmet.

12. The apparatus of claim 11 further including
    inclinometer means mounted on said helmet for providing a level signal in accordance with the inclination of said helmet, and
    circuitry means responsive to said level signal for controlling said segments in accordance therewith.

13. The apparatus of claim 3 further including means for setting said adjustment means for a maximum range thereby observing targets in said scene as silhouettes against a light background.

* * * * *